(12) United States Patent
Yoshiga (10) Patent No.: US 8,194,022 B2
(45) Date of Patent: Jun. 5, 2012

(54) ACTIVE MATRIX DISPLAY DEVICE AND ELECTRONIC DEVICE HAVING THE SAME

(75) Inventor: Masahiro Yoshiga, Kobe (JP)

(73) Assignee: Chimei Innolux Corporation (TW)

( * ) Notice: Subject to any disclaimer, the term of this patent is extended or adjusted under 35 U.S.C. 154(b) by 550 days.

(21) Appl. No.: 12/463,130

(22) Filed: May 8, 2009

(65) Prior Publication Data

US 2009/0284675 A1    Nov. 19, 2009

(30) Foreign Application Priority Data

May 14, 2008  (JP) ................... 2008-127454

(51) Int. Cl.
  *G09G 3/36*  (2006.01)
(52) U.S. Cl. .......................... 345/92; 345/88
(58) Field of Classification Search ............ 345/92, 345/88
  See application file for complete search history.

(56) References Cited

U.S. PATENT DOCUMENTS

| | | | | |
|---|---|---|---|---|
| 6,181,311 | B1* | 1/2001 | Hashimoto ............ | 345/88 |
| 2005/0174313 | A1* | 8/2005 | Kawachi ............... | 345/98 |
| 2007/0285369 | A1* | 12/2007 | Park et al. ............. | 345/90 |
| 2009/0002586 | A1* | 1/2009 | Kimura ................. | 349/39 |

FOREIGN PATENT DOCUMENTS

JP    9329807    12/1997

OTHER PUBLICATIONS

Meng-Chieh Tai et al.; "18.2: MVA-LCD with Low Color Shift and High Image Quality"; SID 07 Digest; 2007; pp. 1007-1009.
Sang Soo Kim et al.; "Distinguished Paper: Novel TFT-LCD Technology for Motion Blur Reduction Using 120Hz Driving with McFi"; SID 07 Digest; 2007; pp. 1003-1006.
Office Action from corresponding application No. JP 2008-127454.

\* cited by examiner

*Primary Examiner* — Kevin M Nguyen
(74) *Attorney, Agent, or Firm* — Lowe Hauptman Ham & Berner, LLP (57) ABSTRACT

An active matrix display device is provided, in which a plurality of different voltages are applied to a pixel having a plurality of liquid crystal units. The display device is composed of a plurality of pixels arranged in a matrix with rows and columns, and a plurality of gate and source lines corresponding to these pixels. Each of the pixels has at least two liquid crystal units $L_1 \sim L_3$, driving transistors $T_1 \sim T_3$ for controlling current flow from one of the source lines $S_i$ and $S_{i+1}$ to a corresponding liquid crystal unit, a storage transistor connected between control electrodes of the driving transistors $T_1/T_2$ and a gate line $G_j$ and operated based on the voltages of the source line $S_i$, and a storage capacitor connected between the control electrodes of the driving transistors $T_1/T_2$ and a common line/previous gate line $G_{j-1}$ for holding a voltage by the storage transistor.

8 Claims, 6 Drawing Sheets

ACTIVE MATRIX DISPLAY DEVICE AND ELECTRONIC DEVICE HAVING THE SAME

CROSS REFERENCE TO RELATED APPLICATIONS

This application claims the benefit of Japan application Serial No. 2008-127454 filed May 14, 2008, the subject matter of which is incorporated herein by reference.

BACKGROUND OF THE INVENTION

1. Field of the Invention

The invention relates to an active matrix display device which comprises a plurality of pixels arranged in a matrix with columns and rows, a plurality of source lines corresponding to the pixels on the columns, a plurality of gate lines corresponding to the pixels on the rows, and a common line coupled to all of the pixels power supply device, and more particularly to an electronic device comprising the active matrix display device.

2. Description of the Related Art

Alignment of liquid crystal molecules varies with variations in voltage applied thereto. A liquid crystal display (LCD) displays images by using the characteristics of the liquid crystal molecules and by transmitting/obstructing external light or backlight light. Generally, LCDs comprise transmissive type LCDs, in which a backlight at the back of a display serves as a light source for displaying, reflective type LCDs, in which external light is reflected for displaying without any backlight source, and trans-reflective type LCDs, in which a backlight source and light which is reflected from external light are used for displaying.

Transmissive type LCDs can advantageously display images with higher chroma, and users can easily view images in a dark environment. However, transmissive type LCDs consume much power due to the required backlight source, and dark images occur under bright environments. Meanwhile, reflective type LCDs advantageously consume less power and users can easily view images in a bright environment. However, reflective type LCDs display image with lower chroma, and users can not easily view images in a dark environment. Thus, trans-reflective type LCDs have grown in popularity. For trans-reflective type LCDs, each pixel is divided into at least one pair of sub-pixels which are used respectively for light transmission and light reflection.

In addition, trans-reflective type LCDs have two modes when voltage is not supplied thereto: a normally white mode in which the LCD displays white; or a normally black mode in which the LCD displays black. Particularly, a vertical alignment (VA) LCD usually uses the normally black mode. However, color shift usually occurs for VA LCDs when in the normally black mode. That is, contrast varies with the different viewing angles of users.

Currently, a method for solving the above problem is to divide one pixel into a plurality of sub-pixels and apply different voltages to each sub-pixel. The sub-pixels display different degrees of brightness in response to the different applied voltages. Since the different degrees of brightness induce an averaging brightness result for eyes of users, the brightness problem is improved, and color shift is eliminated.

Accordingly, when one pixel is divided into a plurality of sub-pixels, a plurality of voltages applied to the sub-pixels are required.

Conventional techniques provide approaches to apply a plurality of voltages to each pixel. One approach is to dispose a plurality of gate lines and source lines to provide different voltages to each element, as shown in non-patent REFERENCE 1. Another approach is to dispose an impedance element, such as a capacitor, coupled to a liquid crystal unit in a particular sub-pixel in parallel and apply a different voltage to the liquid crystal unit of the particular sub-pixel from voltages applied to the liquid crystal units of the other sub-pixels, as shown in non-patent REFERENCE 2.

[REFERENCE 1]: [Novel TFT-LCD Technology for Motion-blur Reducing Using 120-Hz Driving with McFi], S-S. Kim, Section 18.1, SID07 Digest, pages 1003~1006.

[REFERENCE 2]: [MVA-LCD with Low Color Shift and High Image Quality], M-C. Tai, Section 18.2, SID07 Digest, pages 1007~1009.

BRIEF SUMMARY OF THE INVENTION

However, approaches to dispose a plurality of gate lines and source lines may disadvantageously limit pixel aperture areas. Moreover, by disposing an impedance element, coupled to a liquid crystal unit in a particular sub-pixel in parallel, the upper limit of the voltage applied to the liquid crystal unit which is coupled to the impedance element in parallel is lower than the upper limit of the voltage applied to the liquid crystal unit which is not coupled to an impedance element, resulting in a lower transmittance ratio.

Thus, the invention provides an active matrix display device capable of providing different voltages to a pixel having a plurality of liquid crystal units, without lowering pixel aperture ratio and transmittance ratio.

An exemplary embodiment of an active matrix display device of the invention comprises a plurality of pixels arranged in a matrix with columns and rows, a plurality of source buses disposed corresponding to the columns of the pixels, a plurality of gate buses disposed corresponding to the rows of the pixels, and a common bus coupled to all of the pixels. Each pixel comprises at least one liquid crystal unit, at least two driving transistors, a storage transistor, and a storage capacitor. The driving transistors are disposed respectively corresponding to the liquid crystal units and control a current to flow from one of the source buses to one of the liquid crystal units. The storage transistor is coupled between a control electrode of at least one of the driving transistors and the gate bus corresponds to the row which the pixel is on. The storage transistor is activated according to a voltage of the source bus corresponding to the column which the pixel is on. The storage capacitor is coupled between a control electrode of at least one of the driving transistors and the common bus or between a control electrode of at least one of the driving transistors and the gate bus on the previous row to the row which the pixel is on. The storage capacitor stores a voltage, which activates at least one of the driving transistors, through the storage transistor.

Thus, different voltages can be provided to one pixel having at least two liquid crystal units, without lowering pixel aperture ratio and transmittance ratio.

In the active matrix display device of the embodiments of the invention, preferably, each of the driving transistors is coupled between the corresponding liquid crystal unit and the corresponding source bus or between the corresponding liquid crystal unit and the next source bus.

In the active matrix display device of the embodiments of the invention preferably, among the driving transistors, a control electrode of one of the driving transistors is not coupled to the storage capacitor and the storage transistor but to the gate line on the corresponding row.

In the active matrix display device of the embodiments of the invention, preferably, the active matrix display device further comprises a gate driver, a source driver, and a source voltage selector. The gate driver provides a voltage which is switched between two fixed voltages respectively representing a high level and a low level to the gate buses. The source driver provides a variable voltage which is switched within a predetermined voltage range to the pixels through the source buses. The source voltage selector selects the voltage from the source driver or a voltage from an external power source and provides the selected voltage for each of the pixels. The voltage from the source driver is less than the high level fixed voltage and greater than the low level fixed voltage. The voltage from the external power source is greater than the sum of the high level fixed voltage and a threshold voltage of the storage transistor.

Moreover, the source voltage selector comprises a plurality of series circuits which are respectively disposed corresponding to the source buses, wherein each of the series circuits comprises two switch elements having inverse characteristics. One terminal of each of the series circuits is coupled to the source driver, and the other terminal thereof is coupled to the external power source. The source bus is coupled between the two switch elements of the corresponding series circuit.

The active matrix display device can be a transmissive type or a trans-reflective type active matrix display device.

Moreover, the active matrix display device can be applied in an electronic device.

The invention provides an active matrix display device and an electronic device having the active matrix display device which are capable of providing different voltages to a pixel having a plurality of liquid crystal units without lowering pixel aperture ratio and transmittance ratio.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Structure

Figure 1:
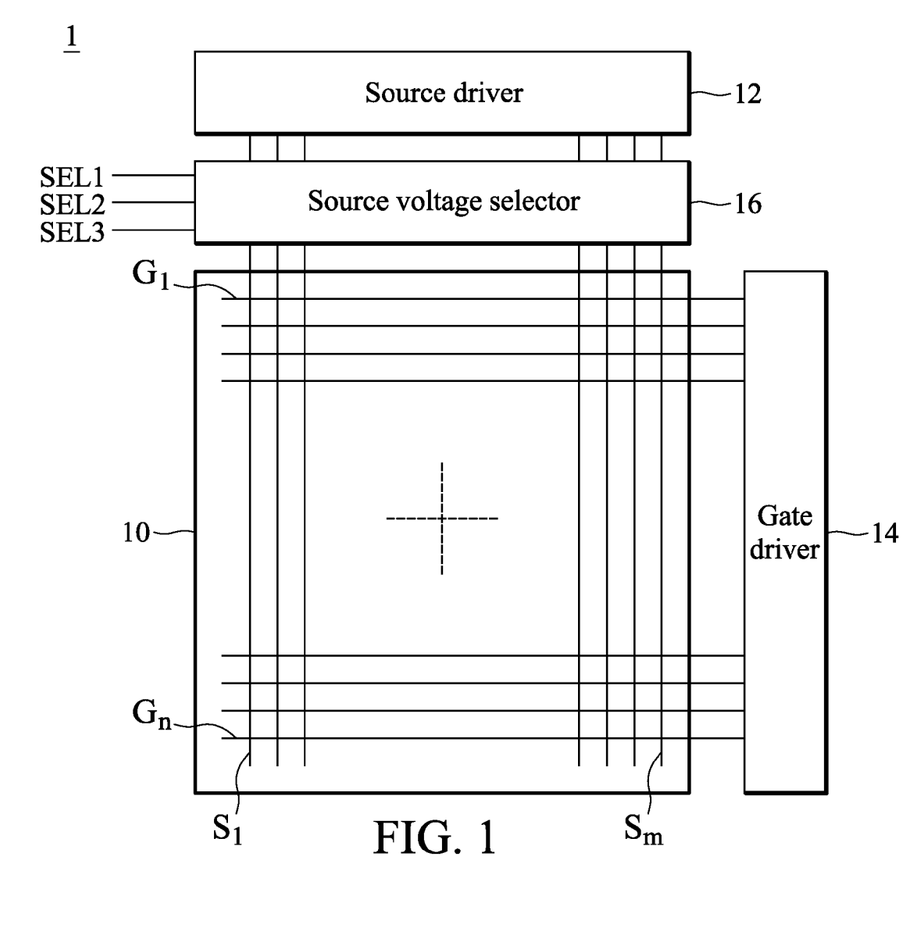
FIG. 1 shows an exemplary embodiment of an active matrix display device of the invention.

FIG. 1 shows an exemplary embodiment of an active matrix display device of the invention. A display device 1 in FIG. 1 comprises a display portion 10, a source driver 12, a gate driver 14, and a source voltage selector 16.

The display portion 10 comprises a plurality of source buses $S_1 \sim S_m$, a plurality of gate buses $G_1 \sim G_n$ (m and n are natural numbers) which interlace with the source buses $S_1 \sim S_m$, a plurality of pixels respectively disposed at the interlacing points and arranged in a matrix with columns and rows (not shown in FIG. 1 for clear description), and a common bus (not shown in FIG. 1) disposed on the inside of the display portion 10 and coupled to all of the pixels. The pixels on the same row share one gate bus, and the pixels on the same column share one source bus.

The source driver 12 is coupled to the display portion 10 via the source buses $S_1 \sim S_m$ which provide driving power to the pixels. The voltage $V_S$ supplied from the source driver 12 is a voltage capable of being switched within a predetermined voltage range (generally, from 0V to 5V). The gate driver 14 is coupled to the display portion 10 via the gate buses $G_1 \sim G_n$ to control the on/off states of the pixels. The voltage $V_g$ supplied from the gate driver 14 is switched between the two fixed voltages $V_H$ and $V_L$ which respectively represent a high level (H) and a low level (L). In the embodiment, the supplied voltage $V_S$ of the source driver 12 is lower than the high level fixed voltage $V_H$ of the supplied voltage $V_g$ of the gate driver 14 and higher than the low level fixed voltage $V_L$ of the supplied voltage $V_g$ of the gate driver 14.

The source voltage selector 16 is coupled between the display portion 10 and the source driver 12 and determines which one of the source driver 12 and an external power source will provide driving power to the pixels of the display portion 10 according to the selection signals SEL1, SEL2, and SEL3 which are externally input. The external power source provides a fixed voltage $V_d$. In the embodiment, the supplied voltage $V_d$ of the external power source is greater than the supplied voltage $V_S$ of the source driver 12. Moreover, the supplied voltage $V_d$ of the external power source is also higher than the high level fixed voltage $V_H$ of the supplied voltage $V_g$ of the gate driver 14. Thus, the relationship $V_d > V_H > V_S > V_L$ is established.

Figure 2:
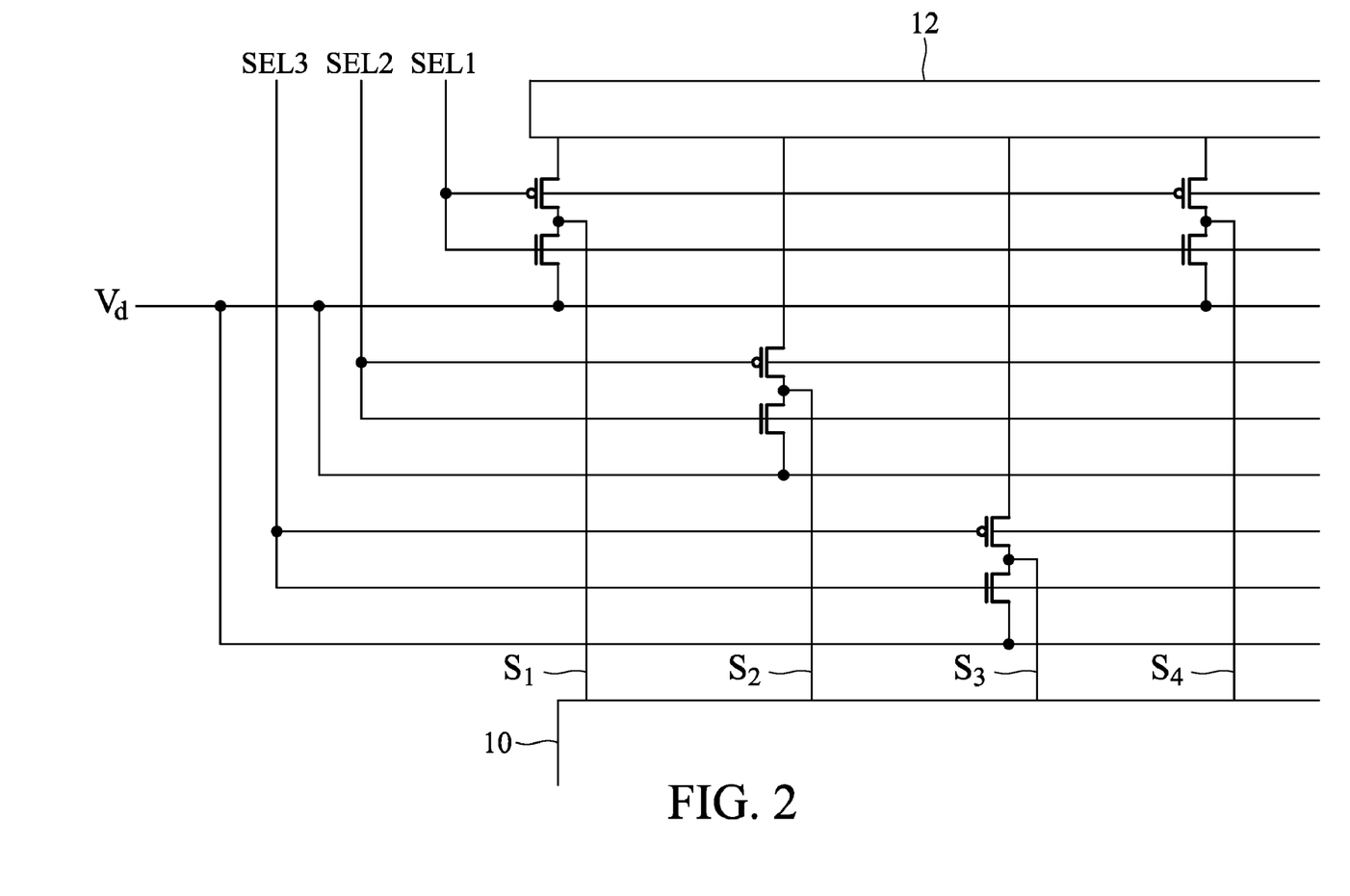
FIG. 2 shows an exemplary embodiment of the source voltage selector in FIG. 1.

Additionally, in the embodiment, a demultiplexer (not shown in FIG. 1) built in the source driver 12 provides voltage signals, which are time-interleave processed with a ratio of 1:3, to the display device. Note that from herefroth, three pixels are referred to as one group. Thus, there are at least three selection signals SEL1, SEL2, and SEL3. The number of the selection signals correlates to the number of the voltage signals output from the demultiplexer during time-interleaving. In practice, the number of the selection signals can be more than 3 or less than 3. FIG. 2 shows an exemplary embodiment of the source voltage selector 16 of the invention.

In the source voltage selector 16 of FIG. 2, two switch elements having inverse characteristics are disposed for each source bus, for example, a P-type transistor and an N-type transistor which are coupled in series. The source of the P-type transistor is coupled to the source driver 12, and the drain thereof is coupled to the drain of the N-type transistor. The source of the N-type transistor is coupled to the supplied voltage $V_d$ of the external power source. The gates of the N-type transistor and the P-type transistor are coupled to one of the selection signals SEL1, SEL2, and SEL3. The drains of the N-type transistor and the P-type transistor are further coupled to one of the corresponding source buses $S_1 \sim S_m$. Moreover, the source voltage selector 16 can employ other switch elements without limitation in the transistors.

The threshold voltage of the P-type transistor and the N-type transistor is set as Vth. When a voltage which is greater than the sum ($V_d$+Vth) of the supplied voltage $V_d$ of the external power source and the threshold voltage Vth of the transistor is input to serve as a selection signal, the N-type transistor is turned on, and the external power source supplies the fixed voltage $V_d$ to the corresponding source bus. At this time, the P-type transistor is turned off. On the other hand, when a voltage which is less than the value $(V_S-Vth)$ obtained by subtracting the threshold voltage Vth of the transistor from the supplied voltage $V_S$ of the source driver is input to serve as a selection signal, the P-type transistor is turned on, and the source driver 12 supplies the variable voltage $V_S$ to the corresponding source bus. At this time, the N-type transistor is turned off.

Thus, the source voltage selector 16 can select which one of the source driver 12 and the external power source to provide driving power to the pixels of the display portion 10 according to the selection signals SEL1, SEL2, and SEL3 which are externally input.

Figure 3A:
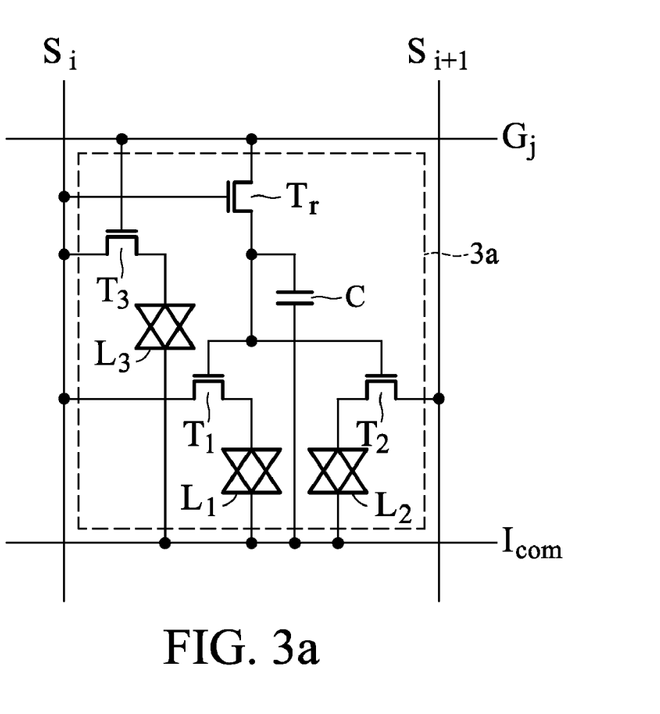
FIGS. 3a and 3b show exemplary embodiments of a pixel structure of the invention.
Figure 3B:
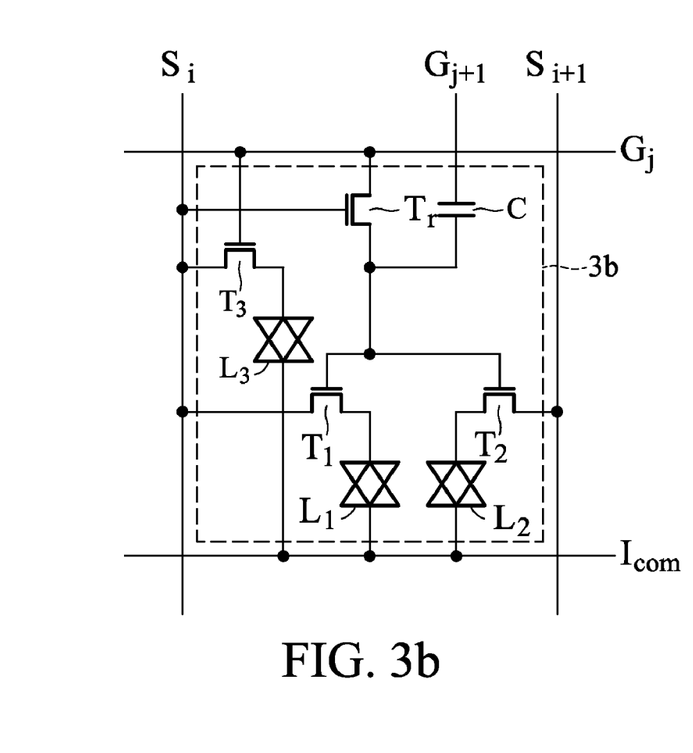

FIGS. 3a and 3b show exemplary embodiments of the pixel structure of the invention.

For example, in a trans-reflective type display device, each pixel is divided into at least two sub-pixels for light transmission and light reflection, and, secondly, the sub-pixel for light transmission is divided into two portions for dealing with color shift. In the embodiments of the invention, a pixel is divided into at least three sub-pixels. As shown in FIGS. 3a and 3b, each of pixels 3a and 3b comprises three liquid crystal units $L_1 \sim L_3$ and driving transistors $T_1 \sim T_3$ respectively corresponding to the liquid crystal units. Each pixel further comprises a storage transistor $T_r$ and a storage capacitor C.

In the pixel 3a of FIG. 3a, one terminal of each of the liquid crystal units $L_1 \sim L_3$ is coupled to a common bus $I_{com}$ with a fixed potential (such as 0V).

The other terminal of the first liquid crystal unit $L_1$ is coupled to the drain of the corresponding first driving transistor $T_1$, and the source of the first driving transistor $T_1$ is coupled to the source bus $S_i$ on the i-th column. The other terminal of the second liquid crystal unit $L_2$ is coupled to the drain of the corresponding second driving transistor $T_2$, and the source of the second driving transistor $T_2$ is coupled to the source bus $S_{i+1}$ on the next column. The gates of the first and second driving transistors $T_1$ and $T_2$ are coupled to one terminal of the storage capacitor C, and the other terminal of the storage capacitor C is coupled to the common bus $I_{com}$.

The gates of the first and second driving transistors $T_1$ and $T_2$ are further coupled to the drain of the storage transistor $T_r$. The source of the storage transistor $T_r$ is coupled to the gate bus $G_j$ on the j-th row, and the gate thereof is coupled to the source bus $S_i$ on the i-th row. Thus, when the storage transistor Tr is turned on, the voltage of the gate bus $G_j$ on the j-th column charges the storage capacitor C through the storage transistor $T_r$. After, when the storage transistor $T_r$ is turned off, the first and second transistors $T_1$ and $T_2$ are turned on by the charging voltage of the storage capacitor C, so that the voltage of the source bus $S_i$ on the i-th column is applied to the first liquid crystal unit $L_1$, and the voltage of the source bus $S_{i+1}$ on the next column is applied to the second liquid crystal unit $L_2$.

Moreover, in order to turn on the storage transistor $T_r$, the voltage applied to the gate of the storage transistor $T_r$ has to be greater than the sum of the voltage applied to the source and the threshold voltage of the storage transistor $T_r$. In other words, the supplied voltage $V_d$ of the external power source has to be greater than the sum of the high level voltage $V_H$ of the gate buses and the threshold voltage of the storage transistor $T_r$.

Meanwhile, the other terminal of the third liquid crystal unit $L_3$ is coupled to the drain of the corresponding third driving transistor $T_3$. The source of the third driving transistor $T_3$ is coupled to the source bus $S_i$ on the i-th column, and the gate thereof is coupled to the gate bus $G_j$ on the i-th row. Thus, when the third driving transistor $T_3$ is turned on, the voltage of the source bus $S_i$ on the i-th column is applied to the third liquid crystal unit $L_3$ through the third driving transistor $T_3$.

In the pixel 3b of FIG. 3b, the other storage capacitor C is not coupled to the common bus $I_{com}$ but to the gate bus $G_{j-1}$ on the previous row, different from the pixel 3a of FIG. 3a. However, the other structures of the pixels 3a and 3b are the same.

Moreover, in the embodiment, the driving transistors $T_1 \sim T_3$ and the storage transistor $T_r$ are implemented by n-type transistors, and, however, they can be implemented by P-type transistors.

Figure 4:
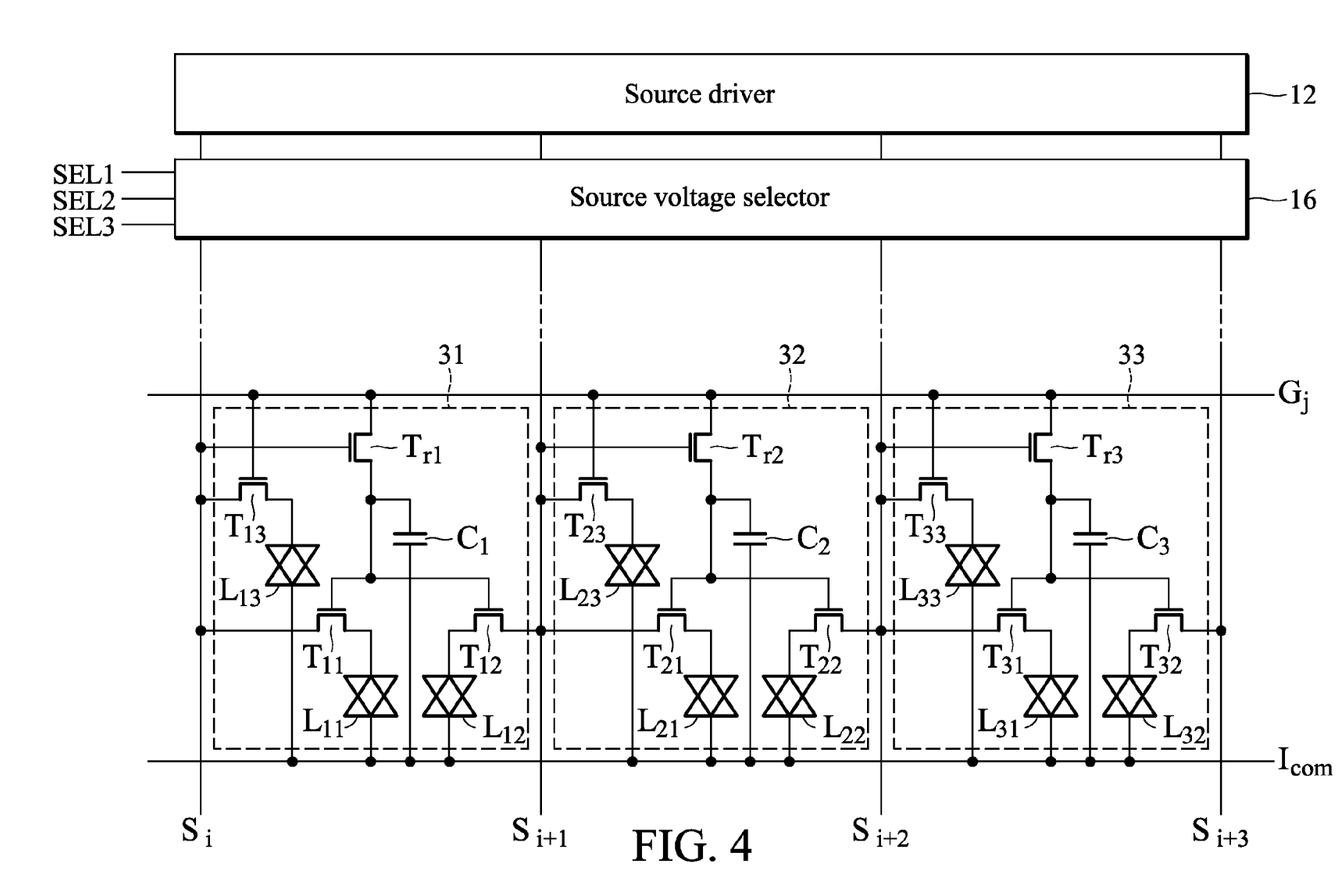
FIG. 4 shows an exemplary embodiment of a structure for one group of three pixels of the invention.

FIG. 4 shows an exemplary embodiment of a pixel structure for one group of three sub-pixels of the invention.

A first pixel 31, a second pixel 32, and a third pixel 33 compose one pixel group. The pixels 31, 32, and 33 have the same structure, for example, as the structure shown in FIG. 3a.

In the following, the pixel structure of FIG. 4 is given as an example for describing the driving operation of the pixels. Even if each pixel of FIG. 4 has the structure of FIG. 3b, the driving operation would be the same.

Driving Operation

Figure 5:
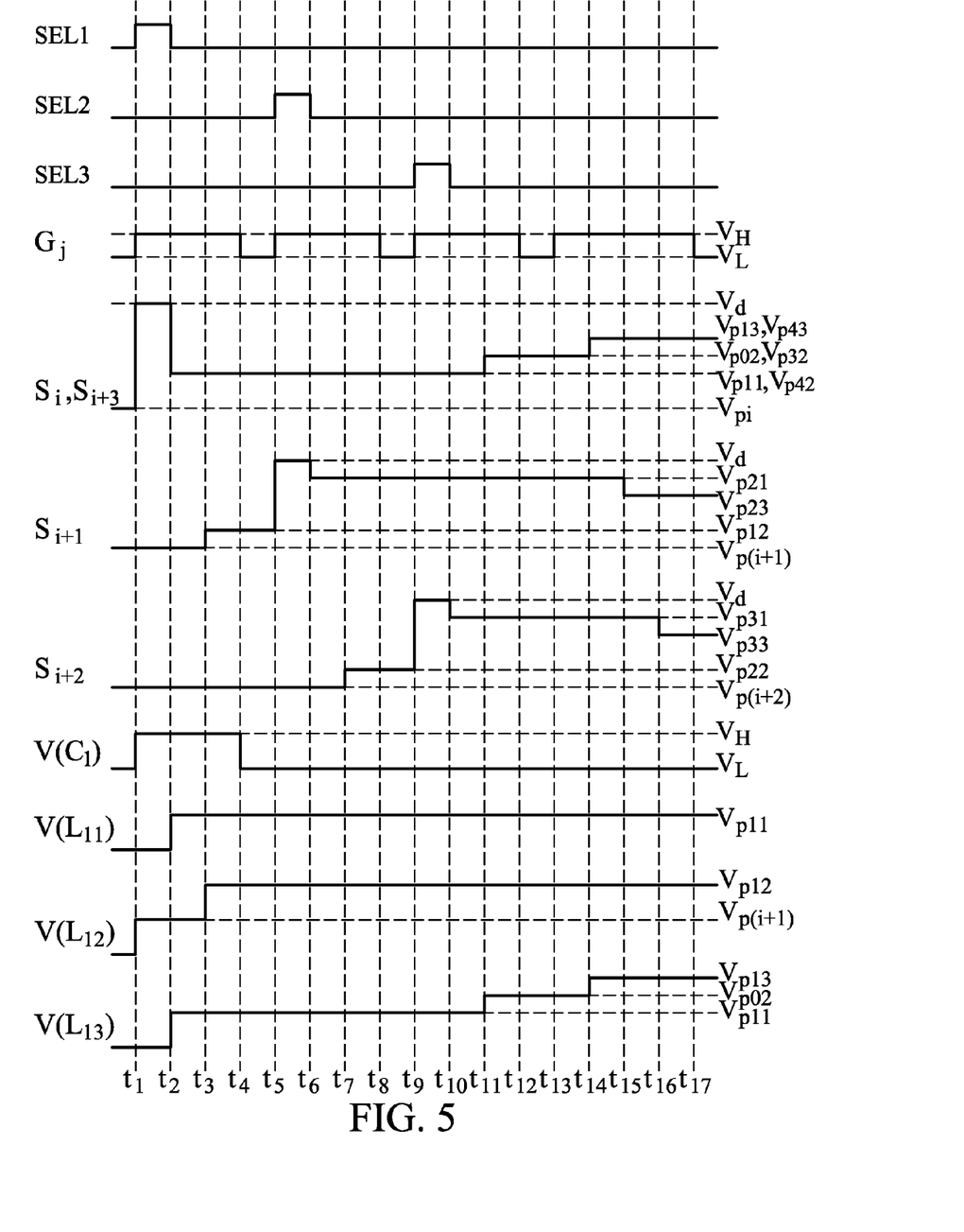
FIG. 5 is a timing chart of the driving operation of the pixels having the structure of FIG. 4.

FIG. 5 is a timing chart of the driving operation of the pixels 31, 32, and 33 having the structure of FIG. 4. SEL1, SEL2, and SEL3 represent the selection signals which are externally input to the source voltage selector 16. $G_j$ represent the control signal which is provided from the gate driver 14 to the gate bus on the j-th row. $S_i$, $S_{i+1}$, $S_{i+2}$, and $S_{i+3}$ represent the voltages which are provided from the source driver 12 or the external power source respectively to the source buses on the i-th~(i+3)-th columns. $V(C_1)$ represents the voltage which is used to charge the storage capacitor $C_1$ of the first pixel 31. $V(L_{11})$, $V(L_{12})$, $V(L_{12})$ represent the voltages which are used respectively to charge the first, second, and third liquid crystal units $L_{11}$, $L_{12}$, and $L_{13}$ of the first pixel 31.

Before the pixels on the j-th row are scanned, that is when the pixels on the (j−1)-th row are driven, the gate bus $G_j$ on the j-th row remains at a low level (L), and there are predetermined voltages $V_{p1} \sim V_{pm}$ respectively on the source buses $S_i \sim S_m$ which are used to drive the pixels on the j-th row. Thus, in all of the pixels 31, 32, and 33, the storage transistors $T_{r1}$, $T_{r2}$, and $T_{r3}$ are turned on. However, since the gate bus $G_j$ is at the low level, the driving transistors $T_{11}$ and $T_{12}$, $T_{21}$ and $T_{22}$, and $T_{31}$ and $T_{32}$ are not turned on, and there is no current between the source and the drain of each of the transistors.

After, at time t1, the gate bus $G_{j-1}$ of the (j−1) row changes to a low level, while the gate bus $G_j$ on the j-th row changes to a high level, and the scanning operation of the pixels on the j-th row begins. At the same time, the selection signal (such as SEL1) of the source voltage selector 16 corresponding to the source bus $S_i$ on the i-th column and the source bus $S_{i+3}$ on the (i+3)-th column is at a high level (that is a voltage greater than the sum of the supplied voltage $V_d$ of the external power source and the threshold voltage Vth of the transistor), and the voltage $V_d$ supplied from the external power source appears on the source buses $S_i$ and $S_{i+3}$.

At this time, the storage transistor $T_{r1}$ of the first pixel 31 is kept turned on. Then, since the gate bus $G_j$ is at the high level, there is current flowing between the source and drain of the storage transistor $T_{r1}$, and the storage capacitor $C_1$ is charged to the voltage $V_H$. Moreover, the voltage at the gate of the second driving transistor $T_{12}$ is equal to the voltage $V_g$ ($V_g=V_H$) on the gate bus $G_j$. Since the voltage $V_H$ is greater than the predetermined voltage $V_{p(i+1)}$ on the source bus $S_{i+1}$ on the (i+1)-th column, the second driving transistor $T_{12}$ is turned on, and a current flows through the corresponding second liquid crystal unit $L_{12}$. Accordingly, the second liquid crystal unit $L_{12}$ is charged to the voltage $V_{p(i+1)}$ of the source bus $S_{i+1}$ on the (i+1)-th column.

Moreover, in the second and third pixels 32 and 33, since the gate bus $G_j$ on the j-th row is at the high level, the third driving transistors $T_{23}$ and $T_{33}$ are turned on. Currents flow respectively through the third liquid crystal units $L_{23}$ and $L_{33}$ corresponding to the third driving transistors $T_{23}$ and $T_{33}$. The liquid crystal unit $L_{23}$ of the second pixel 32 is charged to the voltage $V_{p(i+1)}$ of the source bus $S_{i+1}$ on the (i+1)-th column through the driving transistor $T_{23}$. The liquid crystal unit $L_{33}$ of the third pixel 33 is charged to the voltage $V_p(i+2)$ of the source bus $S_{i+2}$ on the (i+2)-th column through the driving transistor $T_{33}$.

After charging the storage capacitor $C_1$ of the first pixel 31 is completed, at time t2, the selection signal SEL1 changes to a low level (that is a voltage less than the value ($V_S$–Vth) obtained by subtracting the threshold voltage Vth of the transistor from the supplied voltage $V_S$ of the source driver 12), and the voltages $V_S$ ($V_S=V_{p11}$, $V_{p42}$) supplied from the source driver 12 respectively appear on the source buses $S_i$ and $S_{i+3}$. The voltage $V_{p11}$ of the source bus $S_i$ on the i-th column is the voltage required for the activation of the first liquid crystal unit $L_{11}$ of the first pixel 31. Since the voltage $V_{p11}$ is less than the voltage $V_g$ ($V_g=V_H$) of the gate bus $G_j$, in the first pixel 31, the third driving transistor $T_{13}$ is turned on and a current flows through the corresponding liquid crystal unit $L_{13}$ even though the storage transistor $T_{r1}$ is turned off. Accordingly, the third liquid crystal unit $L_{13}$ is charged to the driving voltage $V_{p11}$. Moreover, at this time, the first and second driving transistors $T_{11}$ and $T_{12}$ are turned on due to the charging voltage $V_H$ of the storage capacitor $C_1$, so that currents flow respectively through the liquid crystal units $L_{11}$ and $L_{12}$. Thus, the first liquid crystal unit $L_{11}$ is also charged to the driving voltage $V_{p11}$, and the second liquid crystal unit $L_{12}$ is charged to the voltage $V_{p(i+1)}$ of the source bus $S_{i+1}$ on the (i+1)-th column.

Then, at time t3, the source driver 12 provides a new voltage $V_{p12}$ to the source bus $S_{i+1}$ on the (i+1)-th column, wherein the voltage $V_{p12}$ is a voltage required for the activation of the second liquid crystal unit $L_{12}$ of the first pixel 31. At this time, the states of the transistors on each pixel are not changed, but the second liquid crystal unit $L_{12}$ of the first pixel 31 and the third liquid crystal unit $L_{23}$ of the second pixel 32 are charged to the voltage $V_{p12}$ of the source bus $S_{i+1}$ on the (i+1)-th column respectively through the corresponding driving transistors $T_{12}$ and $T_{23}$.

At a later time t4, the gate bus $G_j$ on the j-th row changes to the low level. Thus, in all of the pixels 31, 32, and 33, the third driving transistors $T_{13}$, $T_{23}$, and $T_{33}$ are turned off, while the storage transistors $T_{r1}$, $T_{r2}$, and $T_{r3}$ are turned on again. Accordingly, in the first pixel 31, the storage capacitor $C_1$ is discharged, so that the first and second driving transistors $T_{11}$ and $T_{12}$ are turned off.

At time t5, the gate bus $G_j$ on the j-th row changes to the high level again. Simultaneously, the selection signal SEL2 of the source voltage selector 16 corresponding to the source bus $S_{i+1}$ on the (i+1)-th column changes to a high level, and the voltage $V_d$ supplied from the external power source appears on the source bus $S_{i+1}$.

At this time, the storage transistor $T_{r2}$ of the second pixel 32 is kept turned on. Then, since the gate bus $G_j$ is at the high level, there is a current flowing between the source and drain of the storage transistor $T_{r2}$, and the storage capacitor $C_2$ is charged to the voltage $V_H$. Moreover, the voltage at the gate of the second driving transistor $T_{22}$ is equal to the voltage $V_g$ ($V_g=V_H$) on the gate bus $G_j$. Since the voltage $V_H$ is greater than the predetermined voltage $V_{p(i+2)}$ on the source bus $S_{i+2}$ on the (i+2)-th column, the second driving transistor $T_{22}$ is turned on, and a current flows through the corresponding second liquid crystal unit $L_{22}$. Accordingly, the second liquid crystal unit $L_{22}$ is charged to the voltage $V_{p(i+2)}$ of the source bus $S_{i+2}$ on the (i+2)-th column.

Moreover, in the first and third pixels 31 and 33, since the gate bus $G_j$ on the j-th row is at the high level, the third driving transistors $T_{13}$ and $T_{33}$ are turned on. Currents flow respectively through the third liquid crystal units $L_{13}$ and $L_{33}$ corresponding to the third driving transistors $T_{13}$ and $T_{33}$. In other words, the third liquid crystal units $L_{13}$ and $L_{33}$ are charged respectively to the voltage $V_{p11}$ of the source bus $S_i$ on the i-th column and to the voltage $V_p(i+2)$ of the source bus $S_{i+2}$ on the (i+2)-th column.

After charging of the storage capacitor $C_2$ of the second pixel 32 is completed, at time t6, the selection signal SEL2 changes to a low level, and the voltages $V_S$ ($V_S=V_{p21}$) supplied from the source driver 12 appears on the source bus $S_{i+1}$. The voltage $V_{p21}$ is the voltage required for the activation of the first liquid crystal unit $L_{21}$ of the second pixel 32. Since the voltage $V_{p21}$ is less than the voltage $V_g$ ($V_g=V_H$) of the gate bus $G_j$, in the second pixel 32, the third driving transistor $T_{23}$ is turned on and a current flows through the corresponding liquid crystal unit $L_{23}$ even though the storage transistor $T_{r2}$ is turned off. Accordingly, the third liquid crystal unit $L_{23}$ is charged to the driving voltage $V_{p21}$. Moreover, at this time, the first and second driving transistors $T_{21}$ and $T_{22}$ are turned on due to the charging voltage $V_H$ of the storage capacitor $C_2$, so that currents flow respectively through the liquid crystal units $L_{21}$ and $L_{22}$. Thus, the first liquid crystal unit $L_{21}$ is also charged to the driving voltage $V_{p21}$, and the second liquid crystal unit $L_{22}$ is charged to the voltage $V_{p(i+2)}$ of the source bus $S_{i+2}$ on the (i+2)-th column.

Then, at time t7, the source driver 12 provides a new voltage $V_{p22}$ to the source bus $S_{i+2}$ on the (i+2)-th column, wherein the voltage $V_{p22}$ is a voltage required for the activation of the second liquid crystal unit $L_{22}$ of the second pixel 32. At this time, the states of the transistors on each pixel are not changed, but the second liquid crystal unit $L_{22}$ of the second pixel 32 and the third liquid crystal unit $L_{33}$ of the third pixel 33 are charged to the voltage $V_{p22}$ of the source bus $S_{i+2}$ on the (i+2)-th column respectively through the corresponding driving transistors $T_{22}$ and $T_{33}$.

At a later time t8, the gate bus $G_j$ on the j-th row changes to a low level. Thus, in all of the pixels 31, 32, and 33, the third driving transistors $T_{13}$, $T_{23}$, and $T_{33}$ are turned off, while the storage transistors $T_{r1}$, $T_{r2}$, and $T_{r3}$ are turned on again. Accordingly, in the second pixel 32, the storage capacitor $C_2$ is discharged, so that the first and second driving transistors $T_{21}$ and $T_{22}$ are turned off.

At time t9, the gate bus $G_j$ on the j-th row changes to a high level again. Simultaneously, the selection signal SEL3 of the source voltage selector 16 corresponding to the source bus $S_{i+2}$ on the (i+2)-th column changes to a high level, and the voltage $V_d$ supplied from the external power source appears on the source bus $S_{i+2}$.

At this time, the storage transistor $T_{r3}$ of the third pixel 33 is kept turned on. Then, since the gate bus $G_j$ is at a high level, there is a current flowing between the source and drain of the storage transistor $T_{r3}$, and the storage capacitor $C_3$ is charged to the voltage $V_H$. Moreover, the voltage at the gate of the second driving transistor $T_{32}$ is equal to the voltage $V_g$ ($V_g=V_H$) on the gate bus $G_j$. Since the voltage $V_H$ is greater than the predetermined voltage $V_{p(i+3)}$ on the source bus $S_{i+3}$ on the (i+3)-th column, the second driving transistor $T_{32}$ is turned on, and a current flows through the corresponding second liquid crystal unit $L_{32}$. Accordingly, the second liquid crystal unit $L_{32}$ is charged to the voltage $V_{p42}$ of the source bus $S_{i+3}$ on the (i+3)-th column.

Moreover, in the first and second pixels 31 and 32, since the gate bus $G_j$ on the j-th row is at a high level, the third driving transistors $T_{13}$ and $T_{23}$ are turned on. Currents flow respectively through the third liquid crystal units $L_{13}$ and $L_{23}$ corresponding to the third driving transistors $T_{13}$ and $T_{23}$. In other words, the third liquid crystal units $L_{13}$ and $L_{23}$ are charged respectively to the voltage $V_{p11}$ of the source bus $S_i$ on the i-th column and to the voltage $V_{p21}$ of the source bus $S_{i+1}$ on the (i+1)-th column.

After charging of the storage capacitor $C_3$ of the second pixel 33 is completed, at time t10, the selection signal SEL3 changes to a low level, and the voltages $V_S$ ($V_S=V_{p31}$) supplied from the source driver 12 appears on the source bus $S_{i+3}$. The voltage $V_{p31}$ is the voltage required for the activation of the first liquid crystal unit $L_{31}$ of the third pixel 33. Since the voltage $V_{p31}$ is less than the voltage $V_g$ ($V_g=V_H$) of the gate bus $G_j$, in the third pixel 33, the third driving transistor $T_{33}$ is turned on and a current flows through the corresponding liquid crystal unit $L_{23}$ even though the storage transistor $T_{r3}$ is turned off. Accordingly, the third liquid crystal unit $L_{33}$ is charged to the driving voltage $V_{p31}$. Moreover, at this time, the first and second driving transistors $T_{31}$ and $T_{32}$ are turned on due to the charging voltage $V_H$ of the storage capacitor $C_3$, so that currents flow respectively through the liquid crystal units $L_{31}$ and $L_{32}$. Thus, the first liquid crystal unit $L_{31}$ is also charged to the driving voltage $V_{p31}$, and the second liquid crystal unit $L_{32}$ is charged to the voltage $V_{42}$ of the source bus $S_{i+3}$ on the (i+3)-th column.

Then, at time t11, the source driver 12 provides new voltages $V_{p02}$ and $V_{p32}$ respectively to the source bus $S_i$ on the i-th column and the source bus $S_{i+3}$ on the (i+3)-th column, wherein the voltage $V_{p32}$ is a voltage required for the activation of the second liquid crystal unit $L_{32}$ of the third pixel 33. At this time, the states of the transistors on each pixel are not changed, but the second liquid crystal unit $L_{32}$ of the third pixel 33 is charged to the voltage $V_{p32}$ of the source bus $S_{i+3}$ on the (i+3)-th column through the corresponding driving transistor $T_{32}$. The third liquid crystal unit $L_{13}$ of the first pixel 31 is charged to the voltage $V_{p02}$ of the source bus $S_i$ on the i-th column through the corresponding driving transistor $T_{13}$.

At a later time t12, the gate bus $G_j$ on the j-th row changes to a low level. Thus, in all of the pixels 31, 32, and 33, the third driving transistors $T_{13}$, $T_{23}$, and $T_{33}$ are turned off, while the storage transistors $T_{r1}$, $T_{r2}$, and $T_{r3}$ are turned on again. Accordingly, in the third pixel 33, the storage capacitor $C_3$ is discharged, so that the first and second driving transistors $T_{31}$ and $T_{32}$ are turned off.

At time t13, when the gate bus $G_j$ on the j-th row changes to a high level again, in the pixels 31, 32, and 33, the storage transistors $T_{r1}$, $T_{r2}$, and $T_{r3}$ are turned off, while the third transistors $T_{13}$, $T_{23}$, and $T_{33}$ are turned on again.

At time t14, the voltage $V_S$ ($V_S=V_{p13}$) supplied from the source driver 12 appears on the source bus $S_i$ on the i-th column. The voltage $V_{p13}$ is the voltage required for the activation of the third liquid crystal unit $L_{13}$ of the first pixel 31. Since the gate bus $G_j$ is still at the high level, the third liquid crystal unit $L_{13}$ of the first pixel 31 is charged to the driving voltage $V_{p13}$ through the corresponding third driving transistor $T_{13}$.

Then, at time t15, the voltage $V_S$ ($V_S=V_{p23}$) supplied from the source driver 12 appears on the source bus $S_{i+1}$ on the (i+1)-th column. The voltage $V_{p23}$ is the voltage required for the activation of the third liquid crystal unit $L_{23}$ of the second pixel 32. Since the gate bus $G_j$ is still at the high level, the third liquid crystal unit $L_{23}$ of the second pixel 32 is charged to the driving voltage $V_{p23}$ through the corresponding third driving transistor $T_{23}$.

At time t16, the voltage $V_S$ ($V_S=V_{p33}$) supplied from the source driver 12 appears on the source bus $S_{i+2}$ on the (i+2)-th column. The voltage $V_{p33}$ is the voltage required for the activation of the third liquid crystal unit $L_{33}$ of the third pixel 33. Since the gate bus $G_j$ is still at the high level, the third liquid crystal unit $L_{33}$ of the third pixel 33 is charged by the driving voltage $V_{p33}$ through the corresponding third driving transistor $T_{33}$.

At the final time t17, the gate bus $G_j$ on the j-th row changes to a low level. In all of the pixels 31, 32, and 33, the third driving transistors $T_{13}$, $T_{23}$, and $T_{33}$ are turned off, while the storage transistors $T_{r1}$, $T_{r2}$, and $T_{r3}$ are turned on.

Throughout all of the operations from the time t1 to the time t17, the required voltages can be applied to all of the liquid crystal units in the pixels 31, 32, and 33.

As described above, in the embodiment, one storage transistor and one storage capacitor are disposed is one pixel, and each storage transistor is coupled between a control electrode of at least one driving transistor (in the embodiment, two driving transistors are given as an example) and the gate bus $G_j$ on the corresponding row. The storage transistor is activated according to the voltage of the source bus $S_i$ on the corresponding column. The storage capacitor is used to store a voltage through the storage transistor, wherein the stored voltage is used to activate at least one driving transistor. Accordingly, difference voltages can be provided to one pixel having a plurality of liquid crystal units, without lowering pixel aperture ratio and transmittance ratio.

The active matrix display device according to the embodiment can be applied in a cellular phone, a personal digital assistant (PDA), a portable music display, a portable game console, and any other portable devices. As described above, in the embodiment, difference voltages can be provided to one pixel having a plurality of liquid crystal units, without lowering pixel aperture ratio and transmittance ratio. Thus, the size of the display device is not increased for an equal pixel aperture ratio and transmittance ratio. However, the invention can also be applied in a television, a personal computer, and any other domestic electronic equipment, without limitation to portable devices. Since different voltages can be provided to one pixel having a plurality of liquid crystal units for solving the color shift problems, the embodiment is preferably applied in wide viewing angle displays.

Variation

In the above embodiment, a trans-reflective type display device in which each pixel is divided into at least three sub-pixels is given as an example. The invention can be applied in a transmissive type display device in which each pixel is divided into at least two sub-pixels.

Figure 6A:
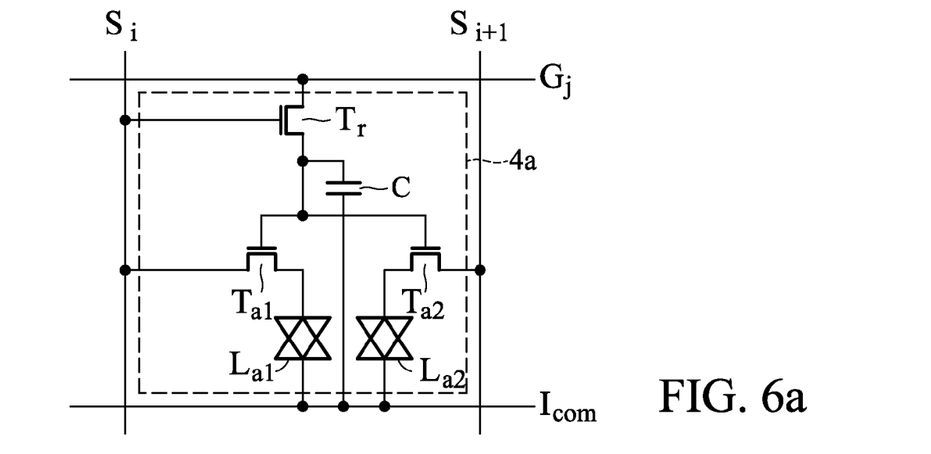
FIGS. 6a, 6b, and 6c show exemplary embodiments of a transmissive type display device of the invention.
Figure 6B:
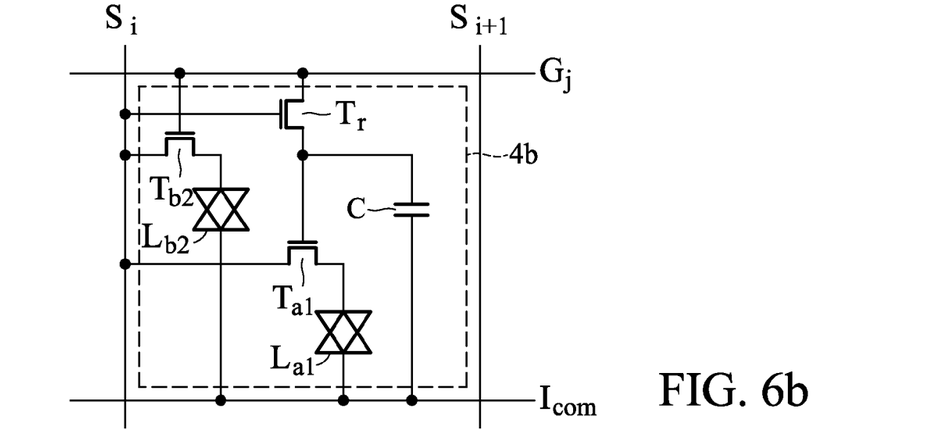
Figure 6C:
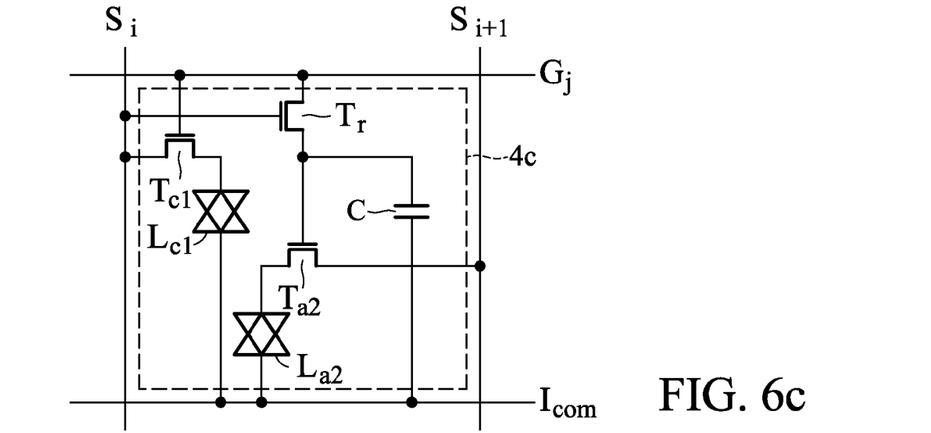

FIGS. 6a, 6b, and 6c show exemplary embodiments of a transmissive type display device of the invention.

A pixel 4a shown in FIG. 6a comprises two liquid crystal units $L_{a1}$ and $L_{a2}$, two driving transistors $T_{a1}$ and $T_{a2}$ respectively corresponding to the liquid crystal units $L_{a1}$ and $L_{a2}$, a storage transistor $T_r$, and a storage capacitor C. One terminal of each of the liquid crystal units $L_{a1}$ and $L_{a2}$ is coupled to a common bus $I_{com}$ with a predetermined fixed potential (for example 0V).

The other terminal of the first liquid crystal unit $L_{a1}$ is coupled to the drain of the corresponding first driving transistor $T_{a1}$, and the source of the first driving transistor $T_{a1}$ is coupled to the source bus $S_i$ in the i-th column. The other terminal of the second liquid crystal unit $T_{a2}$ is coupled to the drain of the corresponding second driving transistor $T_{a2}$, and the source of the second driving transistor $T_{a2}$ is coupled to the source bus $S_{i+1}$ in the next column. The gates of the first and second driving transistors $T_{a1}$ and $T_{a2}$ are coupled to one terminal of the storage capacitor C, and the other terminal of the storage capacitor C is coupled to the common bus $I_{com}$.

Moreover, the gates of the first and second driving transistors $T_{a1}$ and $T_{a2}$ are also coupled to the drain of the storage transistor $T_r$. The source of the storage transistor $T_r$ is coupled to the gate bus $G_j$ on the j-th row, and the gate thereof is coupled to the source bus $S_i$ on the i-th column. When the storage transistor $T_r$ is turned on, the voltage of the gate bus $G_j$ on the j-th row charges the storage capacitor C through the storage transistor $T_r$. Then, when the storage transistor $T_r$ is turned off, the first and second transistors $T_{a1}$ and $T_{a2}$ are turned on due to the charging voltage of the storage capacitor C, so that the voltages of the gate bus $S_i$ on the i-th column and the gate bus $S_{i+1}$ on the (i+1)-th column are applied respectively to the first liquid crystal unit $L_{a1}$ and the second liquid crystal unit $L_{a2}$.

The difference between the pixel 4b of FIG. 6b and the pixel 4a of FIG. 6a is that both of the source of the driving transistor $T_{b2}$ corresponding to the second liquid crystal unit $T_{b2}$ and the source of the first driving transistor $T_{a1}$ are coupled to the source bus $S_i$ on the i-th column, and the gate of the driving transistor $T_{b2}$ is directly connected to the gate bus $G_j$ on the j-th row without going through the storage transistor $T_r$. Thus, when the second driving transistor $T_{b2}$ is turned on, the voltage of the source bus $S_i$ on the i-th column is applied to the second liquid crystal unit $L_{b2}$ through the second driving transistor $T_{b2}$.

The difference between the pixel 4c of FIG. 6c and the pixel 4a of FIG. 6a is that both of the source of the driving transistor $T_{c1}$ corresponding to the first liquid crystal unit $T_{c1}$ and the source of the first driving transistor $T_{a1}$ are coupled to the source bus $S_i$ on the i-th column, and the gate of the driving transistor $T_{c1}$ is directly connected to the gate bus $G_j$ on the j-th row without going through the storage transistor $T_r$. Thus, when the second driving transistor $T_{c1}$ is turned on, the voltage of the source bus $S_i$ on the i-th column is applied to the first liquid crystal unit $L_{c1}$ through the first driving transistor $T_{c1}$.

Accordingly, the invention can be also applied in a display device of the transmissive type in which each pixel is divided into at least two sub-pixels.

Moreover, in the embodiments of FIGS. 6a, 6b, and 6c, one terminal of each capacitor is coupled to the common bus $I_{com}$, however, without limitation. One terminal of each capacitor can be coupled to the gate bus $G_{j-1}$ on the previous row, as shown on FIG. 3b. Moreover, the driving transistor and the storage transistor can be implemented by N-type transistors or P-type transistors.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An active matrix display device comprising:
   a plurality of pixels arranged in a matrix with columns and rows;
   a plurality of source buses disposed corresponding to the columns of the pixels;
   a plurality of gate buses disposed corresponding to the rows of the pixels;
   a common bus coupled to all of the pixels,
   wherein each pixel comprises:
      at least one liquid crystal unit;
      at least two driving transistors, disposed respectively corresponding to the liquid crystal units, for controlling a current to flow from one of the source buses to one of the liquid crystal units;
      a storage transistor, coupled between a control electrode of at least one of the driving transistors and the gate bus corresponding to the row for activation according to a voltage of the source bus corresponding to the column; and
      a storage capacitor, coupled between a control electrode of at least one of the driving transistors and the common bus or between a control electrode of at least one of the driving transistors and the gate bus on the previous row, for storing a voltage, which activates at least one of the driving transistors, through the storage transistor.

2. The active matrix display device as claimed in claim 1, wherein each of the driving transistors is coupled between the corresponding liquid crystal unit and the corresponding source bus or between the corresponding liquid crystal unit and the next source bus.

3. The active matrix display device as claimed in claim 1, wherein among the driving transistors, a control electrode of one of the driving transistors is not coupled to the storage capacitor and the storage transistor but to the gate bus on the corresponding row.

4. The active matrix display device as claimed in claim 1 further comprising:
   a gate driver for providing a voltage which is switched between two fixed voltages respectively representing a high level and a low level to the gate buses;
   a source driver for providing a variable voltage which is switched within a predetermined voltage range to the pixels through the source buses; and
   a source voltage selector for selecting the voltage from the source driver or a voltage from an external power source and providing the selected voltage to each of the pixels;
   wherein the voltage from the source driver is less than the high level fixed voltage and greater than the low level fixed voltage; and
   wherein the voltage from the external power source is greater than the sum of the high level fixed voltage and a threshold voltage of the storage transistor.

5. The active matrix display device as claimed in claim 4, the source voltage selector comprises a plurality of series circuits which are respectively disposed corresponding to the source lines, and each of the series circuits comprises two switch elements having inverse characteristics;
   one terminal of each of the series circuits is coupled to the source driver, and the other terminal thereof is coupled to the external power source; and
   the source line is coupled between the two switch elements of the corresponding series circuit.

6. The active matrix display device as claimed in claim 5, wherein each of the series circuits is an inverter circuit which is composed of a P-type transistor and an N-type transistor.

7. The active matrix display device as claimed in claim 1, wherein the active matrix display device is a transmissive type or a trans-reflective type active matrix display device.

8. An electronic device comprising an active matrix display device as claimed in claim 1.